United States Patent
Choi et al.

(10) Patent No.: US 12,234,830 B2
(45) Date of Patent: Feb. 25, 2025

(54) AIR COMPRESSOR

(71) Applicant: Hanon Systems, Daejeon (KR)

(72) Inventors: Kyu Sung Choi, Daejeon (KR); Hyun Chil Kim, Daejeon (KR); Gun Woong Park, Daejeon (KR); Min Gyu Park, Daejeon (KR); Chi Yong Park, Daejeon (KR); Yeol Woo Sung, Daejeon (KR); Hyun Sup Yang, Daejeon (KR); Jong Sung Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 24 days.

(21) Appl. No.: 18/025,330

(22) PCT Filed: Sep. 8, 2021

(86) PCT No.: PCT/KR2021/012189
§ 371 (c)(1),
(2) Date: Mar. 8, 2023

(87) PCT Pub. No.: WO2022/065752
PCT Pub. Date: Mar. 31, 2022

(65) Prior Publication Data
US 2023/0327524 A1    Oct. 12, 2023

(30) Foreign Application Priority Data
Sep. 24, 2020  (KR) .......... 10-2020-0124084

(51) Int. Cl.
*F04D 25/06* (2006.01)
*H02K 3/50* (2006.01)
*H02K 11/33* (2016.01)

(52) U.S. Cl.
CPC ......... *F04D 25/0693* (2013.01); *F04D 25/06* (2013.01); *H02K 3/50* (2013.01);
(Continued)

(58) Field of Classification Search
CPC ...... F04B 35/04; F04D 25/06; F04D 25/0693; H02K 3/50; H02K 11/33; H02K 2203/09; H02K 2211/03
See application file for complete search history.

(56) References Cited

U.S. PATENT DOCUMENTS

| | | | |
|---|---|---|---|
| 9,447,924 B2 * | 9/2016 | Fukasaku | F04C 23/008 |
| 2010/0303648 A1 * | 12/2010 | Watanabe | H02K 11/33 |
| | | | 417/411 |

(Continued)

FOREIGN PATENT DOCUMENTS

| | | | | |
|---|---|---|---|---|
| CN | 105993115 A | * | 10/2016 | .......... B62D 5/0406 |
| CN | 111379684 A | * | 7/2020 | |

(Continued)

*Primary Examiner* — Alexander B Comley
(74) *Attorney, Agent, or Firm* — NORTON ROSE FULBRIGHT US LLP

(57) ABSTRACT

An air compressor having a housing; a rotating shaft extending in the longitudinal direction inside the housing; a compression unit disposed in front of the rotating shaft and rotated by the rotating shaft to compress and discharge air that flows in; a motor unit which rotates the rotating shaft; a control board which controls the motor unit; a filter unit which supplies external electrical power to the control board and filters the noise of the electrical power; and a bus bar assembly which transfers the electrical power from the control board to the motor unit.

12 Claims, 12 Drawing Sheets

(52) U.S. Cl.
CPC ......... *H02K 11/33* (2016.01); *H02K 2203/09* (2013.01); *H02K 2211/03* (2013.01)

(56) References Cited

U.S. PATENT DOCUMENTS

| | | | | |
|---|---|---|---|---|
| 2010/0327678 | A1* | 12/2010 | Yamasaki | H02K 11/05 |
| | | | | 310/68 D |
| 2015/0061421 | A1* | 3/2015 | Yano | H02K 11/05 |
| | | | | 310/52 |
| 2016/0032930 | A1* | 2/2016 | Kinoshita | F04B 53/16 |
| | | | | 417/410.1 |
| 2016/0111942 | A1* | 4/2016 | Hattori | H02K 11/02 |
| | | | | 310/72 |
| 2018/0026493 | A1* | 1/2018 | Jung | H02K 5/24 |
| | | | | 310/52 |
| 2018/0069487 | A1* | 3/2018 | Hattori | F04B 39/121 |
| 2019/0277290 | A1* | 9/2019 | Seo | F04B 39/12 |
| 2019/0301468 | A1* | 10/2019 | Kataoka | F04C 2/102 |

FOREIGN PATENT DOCUMENTS

| | | | | |
|---|---|---|---|---|
| DE | 102019204141 A1 * | 10/2019 | ......... | B60H 1/00521 |
| JP | 2009-275606 A | 11/2009 | | |
| JP | 2014-058910 A | 4/2014 | | |
| JP | 2019-178648 A | 10/2019 | | |
| JP | 2020122449 A * | 8/2020 | ............. | F04B 35/04 |
| KR | 100962903 B1 | 6/2010 | | |
| KR | 2018-0010129 A | 1/2018 | | |

* cited by examiner

AIR COMPRESSOR

CROSS REFERENCE TO RELATED APPLICATIONS

This application is a national phase under 35 U.S.C. § 371 of International Application No. PCT/KR2021/012189 filed on Sep. 8, 2021, which claims the benefit of priority from Korean Patent Application No. 10-2020-0124084 filed on Sep. 24, 2020. The entire contents of these applications are incorporated herein by reference in their entirety.

TECHNICAL FIELD

The Present invention relates to an air compressor, and more specifically, to an air compressor including a control board for controlling and driving a motor.

BACKGROUND ART

In general, a fuel cell vehicle refers to a vehicle in which hydrogen and oxygen are supplied to a humidifier and electric energy generated through an electrochemical reaction, which is a reverse reaction of an electrolysis of water, is supplied as a driving force of the vehicle, and a typical fuel cell vehicle is disclosed in Korean Patent Registration No. 0962903.

In general, an 80 kW fuel cell stack is mounted in a passenger fuel cell vehicle, and when the fuel cell stack is operated under a pressurized condition, air at a high pressure of 1.2 to 3.0 bar is supplied to the fuel cell stack, and, to this end, an air compressor having the number of revolutions of 5,000 to 100,000 rpm should be used.

A fuel cell vehicle generally includes a fuel cell stack which produces electricity, a humidifier which humidifies fuel and air and supplies the humidified fuel and air to the fuel cell stack, a fuel supply unit which supplies hydrogen to the humidifier, an air supply unit which supplies the air containing oxygen to the humidifier, a cooling module for cooling the fuel cell stack, and the like.

The air supply unit includes an air cleaner which filters foreign matter contained in the air, an air compressor which compresses and supplies the air filtered by the air cleaner, and a control box which controls the air compressor.

The above-described air compressor compresses air suctioned from the outside using an impeller and then discharges the compressed air to the fuel cell stack through a discharge port. In this case, the impeller and a shaft constituting a compression unit are driven by a rotational force of a motor.

An inverter supplies power to the motor of such an air compressor and controls an operation of the motor. The inverter includes a printed circuit board (PCB) on which transistors, capacitors, inductors, and electrical elements, such as constant resistors, diodes, and drivers, are mounted.

However, the conventional air compressor has a problem that space utilization is lowered when the motor and the inverter are integrally disposed, and thus, a volume of the air compressor increases. In addition, in a process of installing a noise filter unit which removes noise of the power supplied from the outside, there is a problem that the number of components and the number of assembly processes increase, and thus manufacturing costs increase.

Related Art (Patent Document 1) Korean Registered Patent No. 0962903 (Registered at Jun. 1, 2010)

Technical Problem

The present invention is intended to address the above-described problems and directed to providing an air compressor in which space utilization between a motor and a filtering unit, which removes noise of power provided to the motor, is improved and an assembly process of the filtering unit is simplified.

Objectives to be addressed by the present invention are not limited to the above-described objectives, and other objectives, which are not described above, will be clearly understood by those skilled in the art through the following specification.

Technical Solution

One aspect of the present invention provides an air compressor including a housing, a rotating shaft extending in a longitudinal direction in the housing, a compression unit which is disposed in front of the rotating shaft and rotated by the rotating shaft to compress and discharge introduced air, a motor unit which rotates the rotating shaft, a control board which controls the motor unit, a filter unit which supplies external power to the control board and filters noise of the power, and a busbar assembly which transmits power of the control board to the motor unit.

The filter unit may be disposed outside the motor unit in a radial direction.

The busbar assembly may include a plurality of busbars electrically connected to the motor unit and a busbar fixing member which fixes the plurality of busbars to the housing in a state in which the plurality of busbars are insulated.

The plurality of busbars may extend outward from the motor unit in the radial direction, and each end portion of the plurality of busbars may be bent in at least two directions.

The end portions of the plurality of busbars may be exposed from the busbar fixing member in a state in which the end portions of the plurality of busbars are spaced apart from each other.

The filter unit may include a transistor connected to the control board, a capacitor assembly connected to one side of the transistor, and a current sensor assembly connected to the other side of the transistor, wherein the capacitor assembly and the current sensor assembly may be disposed at both sides with respect to the busbar assembly.

The plurality of busbars may include a U-phase busbar on which an end portion is bent toward the capacitor assembly and a V-phase busbar and a W-phase busbar of which end portions are bent toward the current sensor assembly, wherein the U-phase busbar may be electrically connected to the capacitor assembly, and the V-phase busbar and the W-phase busbar may be electrically connected to the current sensor assembly.

The capacitor assembly may include a case, a capacitor module embedded in the case, and a power transmission busbar integrally formed with the case and connected to the U-phase busbar.

The power transmission busbar may be integrally formed with the case in an injection molding method.

The power transmission busbar may be assembled with the case.

The housing may include a filter accommodation unit in which the filter unit is accommodated.

The filter accommodation unit may include at least one mounting surface, on which the filter unit is mounted, and at least one weight lightening groove portion in which the filter unit is disposed may be formed in the mounting surface.

A plurality of coupling regions, in which the capacitor assembly, the current sensor assembly, and the busbar assembly are coupled, may be disposed on the mounting surface, and all of the plurality of coupling regions may be positioned coplanar with each other.

The air compressor may further include a plurality of cooling paths disposed between the motor unit and the filter unit, wherein the plurality of cooling paths may be disposed to be space apart from each other in a circumferential direction of the motor unit to surround at least one side of the motor unit.

The busbar assembly may be disposed to pass between the plurality of cooling paths spaced apart from each other.

The air compressor may include a connector unit through which a high-voltage direct current (DC) current is applied to the filter unit and a signal detected by the filter unit is transmitted to the control board.

The connector unit may include a first connector which electrically connects the control board and the current sensor assembly and a second connector which electrically connects an external power source and the capacitor assembly and through which a high-voltage DC current is applied to the capacitor assembly.

The first connector may include an interlock wire which is electrically connected to the second connector and checks whether the capacitor assembly and the second connector are connected.

The transistor may be an insulated gate bipolar transistor (IGBT).

The air compressor may include a cooling cover which is disposed to cover at least one surface of the transistor and absorbs heat of the transistor.

The cooling cover may include a connector fixing part to fix one side of the connector unit.

The housing may include a second accommodation unit in which the control board is disposed, and the first accommodation unit and the second accommodation unit may be disposed orthogonal to each other.

Advantageous Effects

In an air compressor according to the present invention, assemblability can be improved, manufacturing costs can be reduced, and a size of the air compressor can be minimized by improving space utilization of a filter unit and reducing the number of components constituting the filter unit.

According to the present invention, assembly convenience of an air compressor can be improved by implementing each end portion of busbars, which apply a three-phase current, as a structure branched in two directions to secure a sufficient assembly space for a filter unit and the busbar.

Various useful advantages and effects of the present invention are not limited to the above-described content and may be more easily understood while specific embodiments of the present invention are described.

MODES OF THE INVENTION

Figure 1:
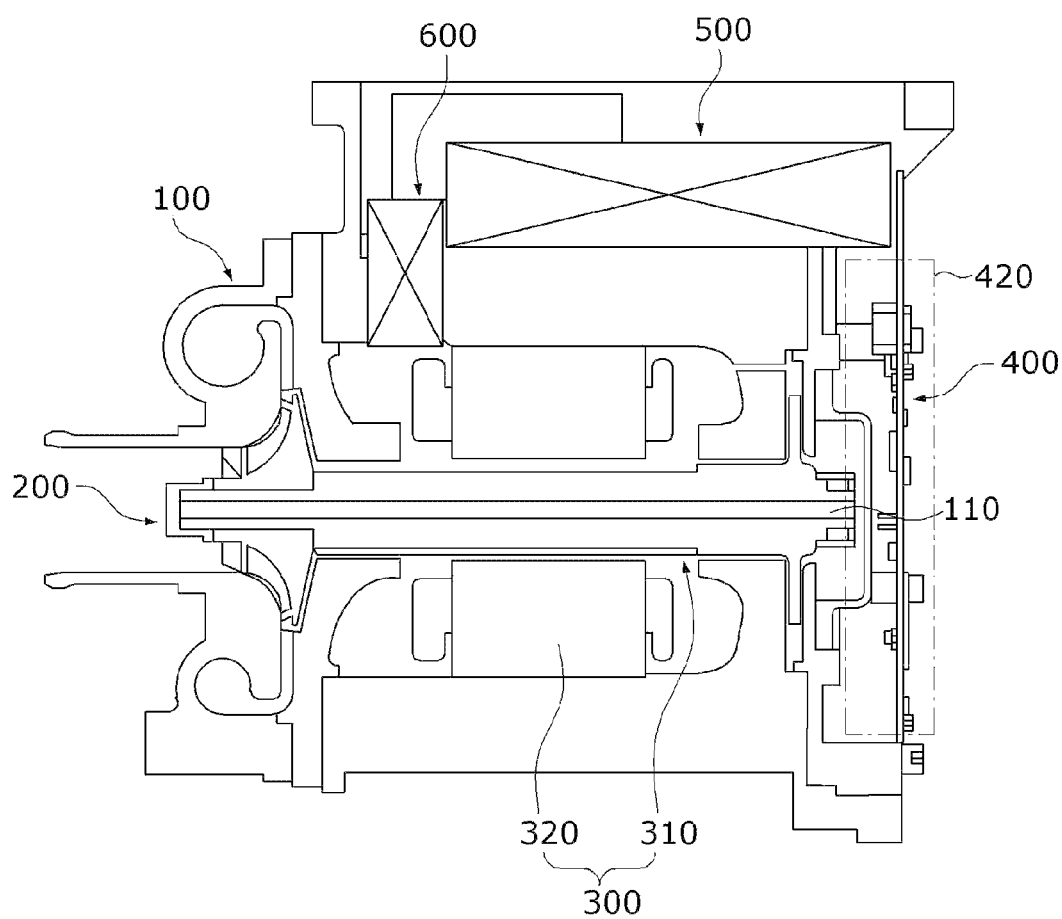
FIG. 1 is a cross-sectional view illustrating an air compressor according to one embodiment of the present invention.

Hereinafter, exemplary embodiments of the present specification will be described in detail with reference to the accompanying drawings.

However, the technical spirit of the present invention is not limited to some embodiments which will be described and may be implemented using various other embodiments, and one or more components of the embodiments may be selectively coupled, substituted, and used within the range of the technical spirit of the present invention.

In addition, unless clearly and specifically defined otherwise by the context, all terms (including technical and scientific terms) used herein may be interpreted as having meanings generally understood by those skilled in the art, and the meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" may be used.

The terms are only to distinguish one element from another element, and the essence, order, and the like of the elements are not limited by the terms.

In addition, when an element is referred to as being "connected," "coupled," or "linked" to another element, such a description may include both a case in which the element is directly connected or coupled to another element and a case in which the element is connected, coupled, or linked to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, embodiments will be described in detail with reference to the accompanying drawings, and components that are the same or correspond to each other will be denoted by the same reference numerals in all of the figures, and redundant descriptions will be omitted.

In FIGS. 1 to 12, only main parts are clearly illustrated in order to conceptually clearly understand the present invention, and thus, various variations of the drawings are expected, and there is no need for the scope of the present invention to be limited by specific shapes illustrated in the drawings.

Figure 2:
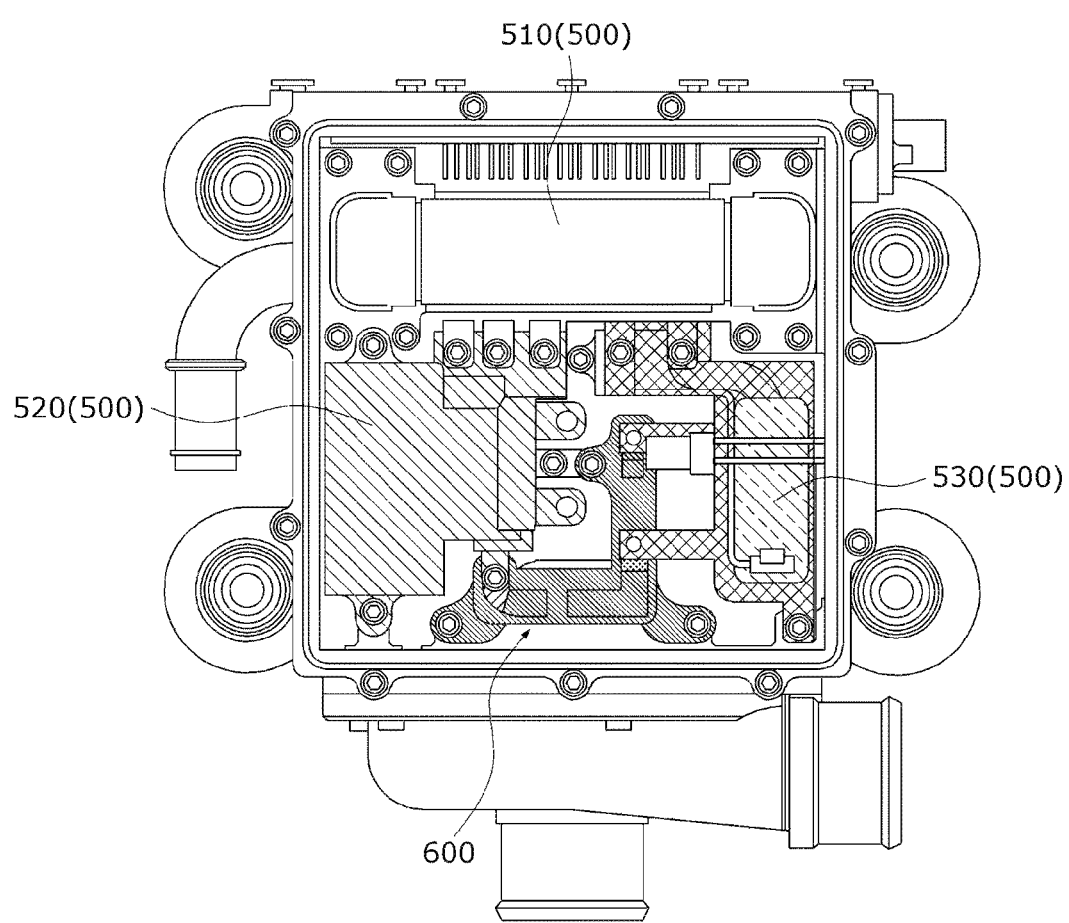
FIGS. 2 and 3 are plan views illustrating the air compressor according to one embodiment of the present invention.
Figure 3:
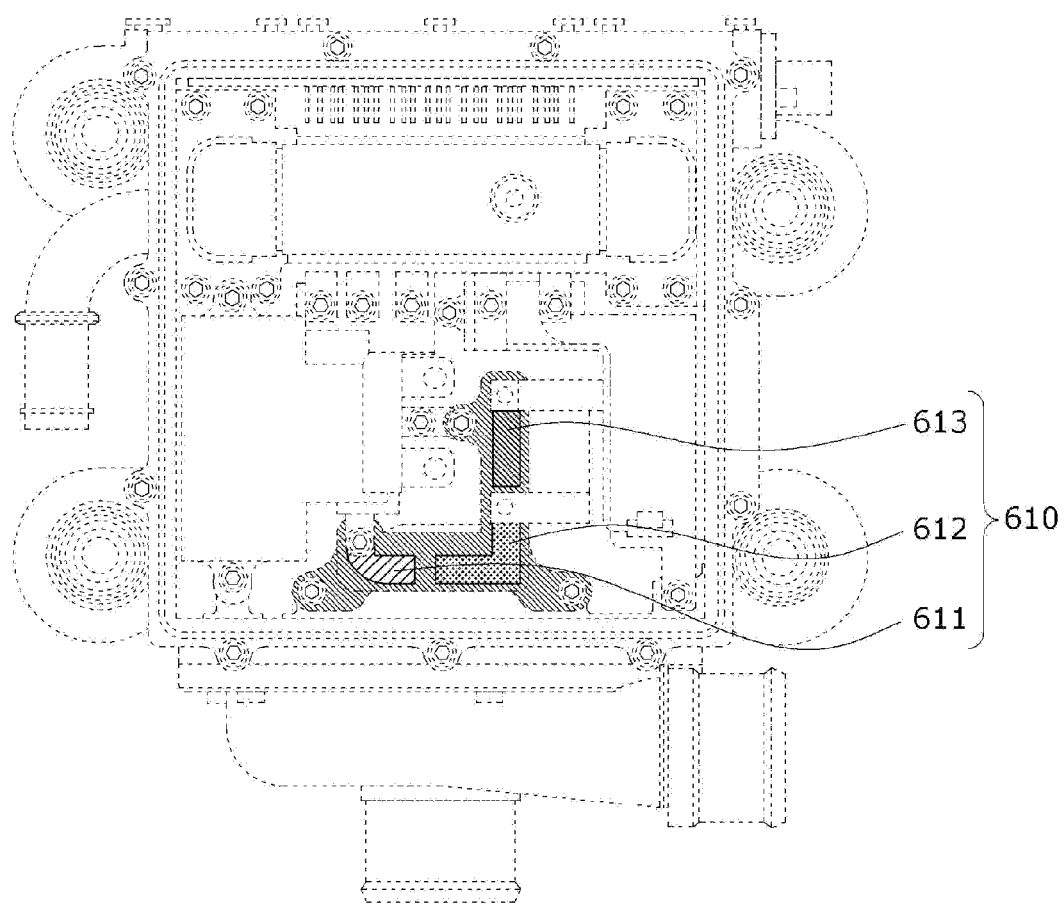
Figure 4:
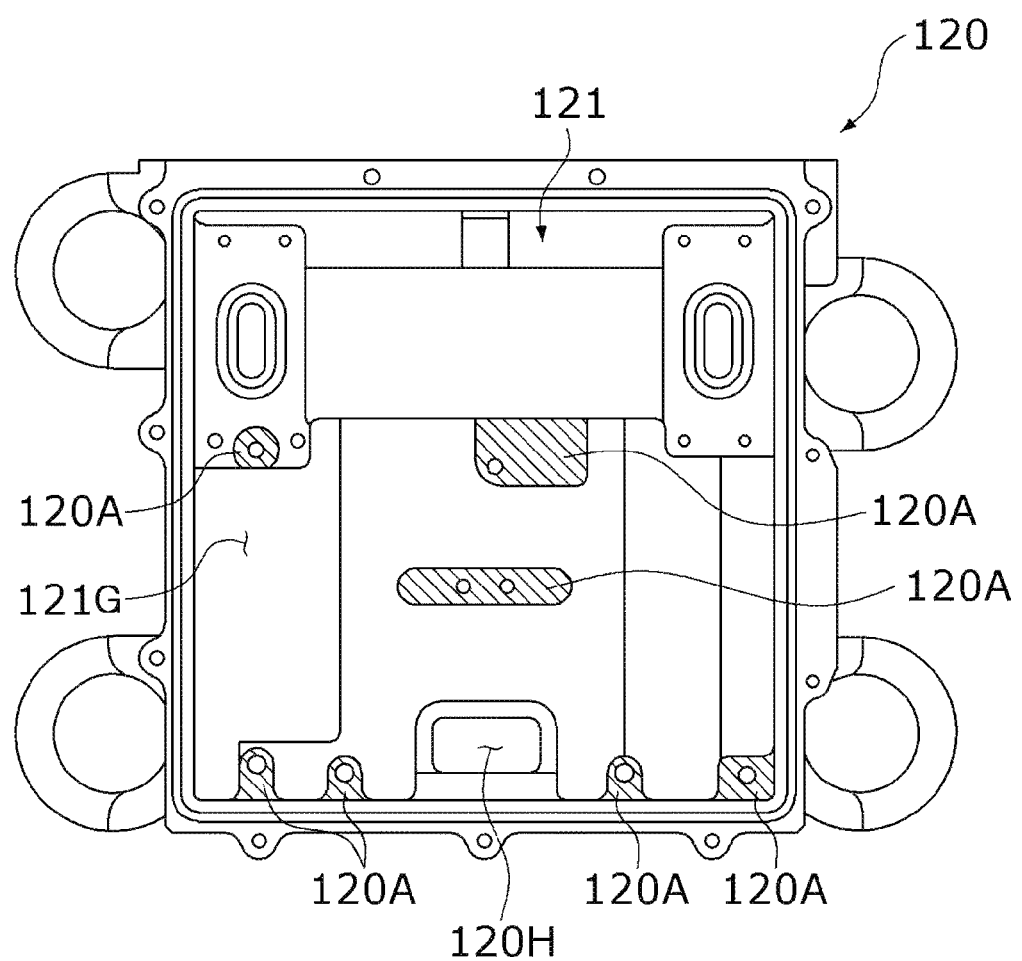
FIG. 4 is a plan view illustrating a housing included in the air compressor according to one embodiment of the present invention.

FIG. 1 is a cross-sectional view illustrating an air compressor according to one embodiment of the present invention, FIGS. 2 and 3 are plan views illustrating the air compressor according to one embodiment of the present invention, and FIG. 4 is a plan view illustrating a housing included in the air compressor according to one embodiment of the present invention.

Referring to FIGS. 1 to 4, the air compressor may include a housing 100, a compression unit 200, a motor unit 300, a control board 400, a filter unit 500, and a busbar assembly 600.

The housing 100 constitutes an exterior, and a rotating shaft 110, the compression unit 200, and the motor unit 300 are disposed in the housing 100.

The compression unit 200 is disposed at a front side in the housing 100. In this case the front side is disposed in a direction from the motor unit 300 toward the compression unit 200, and a rear side is disposed in a direction opposite to the direction toward the front side.

The motor unit 300 serves to rotationally drive the rotating shaft 110 to supply a driving force to the compression unit 200. In this case, the motor unit 300 includes a rotor 310 and a stator 320. The stator 320 includes a driving coil, and the driving coil generates an electromagnetic force when power is supplied from outside. Accordingly, the rotor 310 may rotate due to an electromagnetic interaction between the rotor 310 and the stator 320. Meanwhile, one side of the rotor 310 is connected to the compression unit 200 to drive the compression unit 200. In this case, the driving coil may be operated by receiving a three-phase alternating current (AC) power.

A circuit and an element for controlling the motor unit 300 are mounted on the control board 400. In this case, the control board 400 may be a printed circuit board (PCB).

As one embodiment, the housing 100 may include a second accommodation unit 420 in which the control board 400 is disposed.

The control board 400 may be disposed in the second accommodation unit 420, which is positioned behind the rotating shaft 110 and the motor unit 300, and may be spaced apart from a rear end of the rotating shaft 110. In this case, the control board 400 may be formed in a substrate shape and disposed so that a thickness direction is directed toward an axial direction of the rotating shaft 110.

The filter unit 500 receives external power and supplies the external power to the control board 400 in a state in which noise of the power is removed. In this case, the filter unit 500 may be disposed outside the motor unit 300 in a radial direction.

The busbar assembly 600 transmits the power of the control board 400 to the motor unit 300. In this case, the power may be transmitted to the motor unit 300 through the filter unit 500 and the busbar assembly 600. The busbar assembly 600 may transmit a three-phase AC voltage converted by the filter unit 500 to the motor unit 300.

The housing 100 includes a first accommodation unit 120 accommodating the filter unit 500 at one side. In this case, the first accommodation unit 120 may be disposed outside the motor unit 300 in the radial direction.

In addition, the housing 100 may include at least one mounting surface 121 which is disposed in the first accommodation unit 120 and on which the filter unit 500 is mounted. According to the embodiment, the filter unit 500 may be mounted on the one mounting surface 121.

In addition, the first accommodation unit 120 and the second accommodation unit 420 may be disposed orthogonal to each other. The first accommodation unit 120 and the second accommodation unit 420 may be orthogonally disposed to minimize interference between the accommodation units, and ease of package can be improved due to efficient space utilization.

At least one weight lightening groove portion 121G may be formed on the mounting surface 121. In this case, at least one of a capacitor assembly 520 and a current sensor assembly 530 may be disposed in the weight lightening groove portion 121G. In addition, a through hole 120H through which the busbar assembly 600 passes may be formed in the mounting surface 121. In this case, with respect to the through hole 120H, one end portion of the busbar assembly 600 is electrically connected to the motor unit 300, and the other end portion may be electrically connected to the filter unit 500.

Accordingly, a size of the air compressor may be reduced by minimizing a thickness of the housing between the motor unit 300 and the filter unit 500 and compactly arranging components of the filter unit 500 in the first accommodation unit 120.

The filter unit 500 may include a transistor 510, the capacitor assembly 520, and the current sensor assembly 530.

The transistor 510 converts a direct current (DC) voltage into a driving voltage of the motor unit 300 through a switching operation. The transistor 510 is disposed behind the first accommodation unit 120 and connected to the control board 400. In this case, the transistor 510 may be an insulated gate bipolar transistor (IGBT).

The transistor 510 includes six IGBTs including a first phase (Phase U) high switching element, a first phase (Phase U) low switching element, a second phase (Phase V) high switching element, a second phase (Phase V) low switching element, a third phase (Phase W) high switching element, and a third phase (Phase W) low switching element. The transistor 510 is connected to the capacitor assembly 520 and the current sensor assembly 530.

The capacitor assembly 520 is electrically connected to an external power source and receives and stores a high-voltage DC current. In addition, the capacitor assembly 520 is electrically connected to the transistor 510 and the busbar assembly 600.

The current sensor assembly 530 detects a current transmitted to the motor unit 300. The current sensor assembly 530 is electrically connected to the transistor 510 and the busbar assembly 600. In this case, the busbar assembly 600 and the transistor 510 may be disposed with the capacitor assembly 520 and the current sensor assembly 530 interposed therebetween.

The transistor 510, the capacitor assembly 520, and the current sensor assembly 530 may be coupled to the mounting surface 121. In this case, a plurality of coupling regions 120A for coupling the transistor 510, the capacitor assembly 520, and the current sensor assembly 530 may be disposed on the mounting surface 121. In addition, coupling holes for bolt-coupling may be formed in the plurality of coupling regions 120A.

The plurality of coupling regions 120A may be positioned coplanar with each other. Accordingly, in a process of coupling the transistor 510, the capacitor assembly 520, and the current sensor assembly 530 to the mounting surface 121, dimensional management can be easy, and a work time can be reduced.

Figure 5:
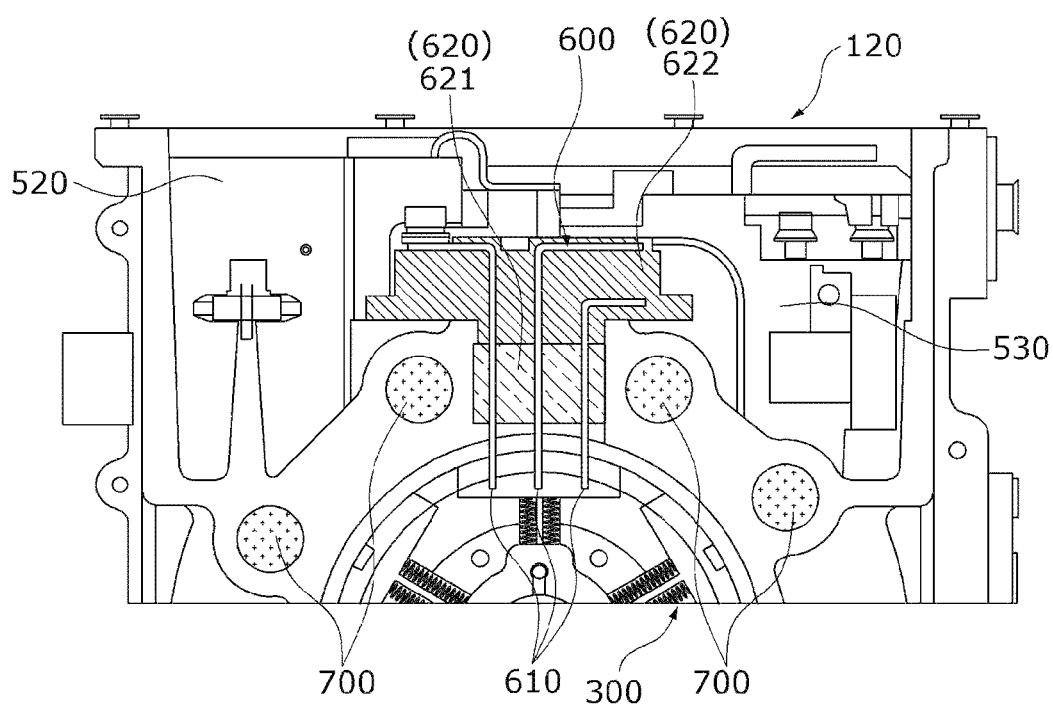
FIG. 5 is a partial cross-sectional view illustrating the air compressor according to one embodiment of the present invention.

FIG. 5 is a partial cross-sectional view illustrating the air compressor according to one embodiment of the present invention.

Referring to FIGS. 3 and 5, the busbar assembly 600 may include a busbar 610 and a busbar fixing member 620.

The busbar 610 is electrically connected to the motor unit 300. In this case, the busbar 610 supplies an AC voltage converted by the transistor 510 to the motor unit 300. The busbar 610 may be provided as a plurality of busbars 610. The plurality of busbars 610 may include a U-phase busbar 611 which transmits AC power of a first phase (Phase U), a V-phase busbar 612 which transmits AC power of a second phase (Phase V), and a W-phase busbar 613 which transmits AC power of a third phase (Phase W).

The plurality of busbars 610 may extend outward from the motor unit 300 in the radial direction. In addition, the busbars 610 may pass through the through hole 120H and may be bent in at least two directions. In this case, the U-phase busbar 611 may be bent toward the capacitor assembly 520, and the remaining V phase and W phase busbars 612 and 613 may be bent toward the current sensor assembly 530.

Each end portion of the U-, V-, and W-phase busbars 611, 612, and 613 may be exposed from the busbar fixing member 620 in a state in which the end portions are spaced apart from each other. In this case, the end portion of at least one of the plurality of busbars 610 may be connected to the capacitor assembly 520, and the rest of the plurality of busbars 610 may be connected to the current sensor assembly 530.

According to the embodiment, since the end portions of the busbars 610 are disposed to be branched in two directions, assembly space can be secured between the busbars 610, the capacitor assembly 520, and the current sensor assembly 530, and thus assembly convenience can be improved.

The busbar fixing member 620 fixes the busbars 610 to the housing 100 in a state in which the plurality of busbars 610 are insulated. To this end, the busbar fixing member 620 may include a grommet 621 and a guide member 622.

The grommet 621 is disposed in the through hole 120H and fixes the plurality of busbars 610 passing through the through hole 120H. In this case, the grommet 621 may have elasticity and may be formed of an insulating material. Preferably, the grommet 621 may be formed of a rubber material.

The guide member 622 fixes at least parts of the plurality of busbars 610 to the mounting surface 121. In this case, the guide member 622 may guide each of the end portions of the plurality of busbars 610 to the capacitor assembly 520 or the current sensor assembly 530. The guide member 622 may be formed of an insulating material. Preferably, the guide member 622 may be formed of a plastic material.

According to the embodiment, the air compressor according to present invention includes a plurality of cooling paths 700 which cool the motor unit 300.

The plurality of cooling paths 700 may be embedded in the housing 100 and disposed between the motor unit 300 and the filter unit 500. In this case, the plurality of cooling paths 700 may be disposed to be spaced apart from each other in a circumferential direction of the motor unit 300 to surround at least one side of the motor unit 300 and may absorb heat generated by the motor unit 300.

The busbar assembly 600 may be disposed to pass between the plurality of cooling paths 700 spaced apart from each other. In this case, the plurality of cooling paths 700 may also absorb heat generated by the busbars 610 to prevent overheating of the busbars 610.

Figure 6:
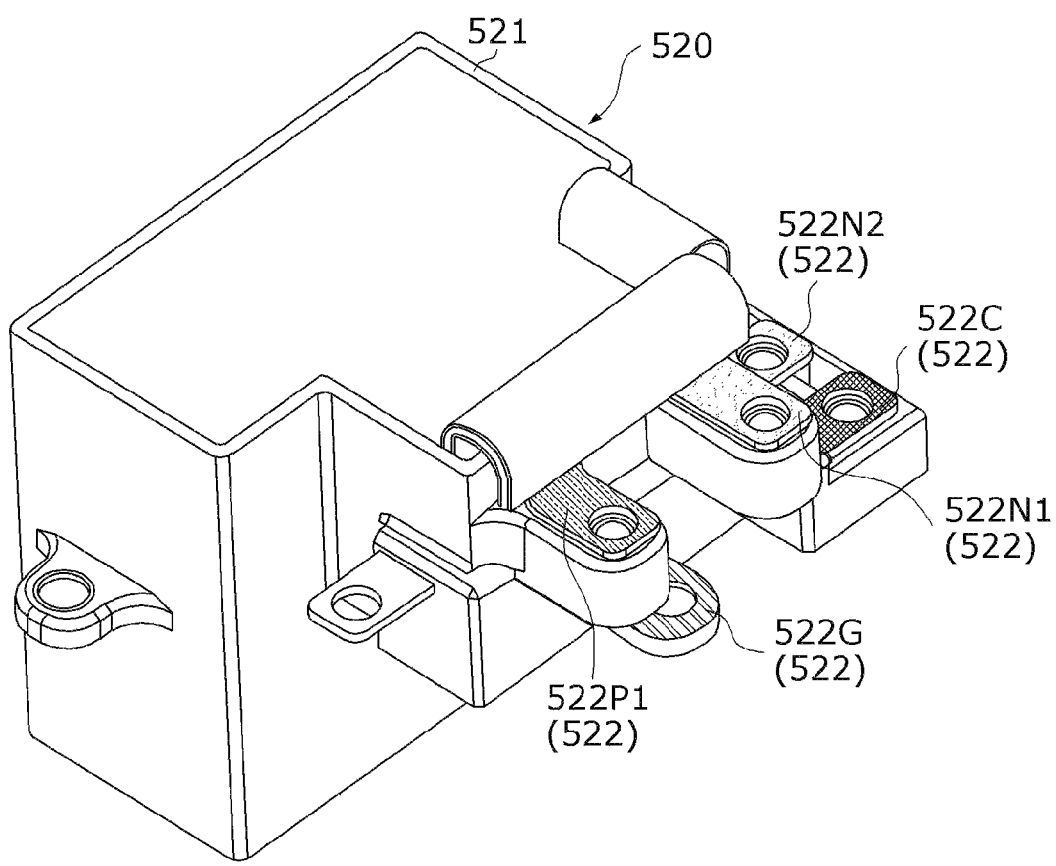
FIGS. 6 and 7 are perspective views illustrating a first example of a capacitor assembly included in the air compressor according to one embodiment of the present invention.
Figure 7:
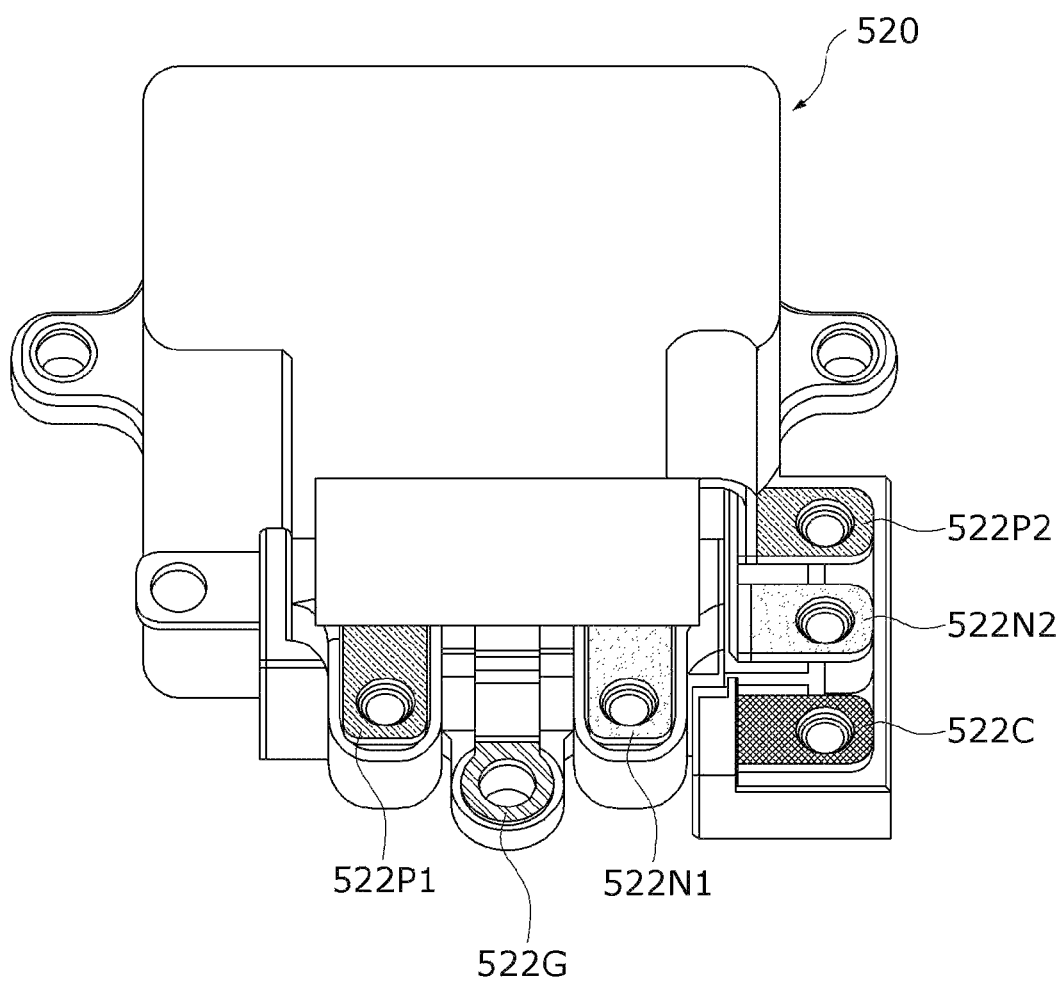

FIGS. 6 and 7 are perspective views illustrating a first example of a capacitor assembly included in the air compressor according to one embodiment of the present invention.

Referring to FIGS. 6 and 7, the capacitor assembly 520 may include a case 521, a capacitor module (not shown), a power transmission busbar 522C, and a plurality of connection terminals 522.

The case 521 forms a space therein, and the capacitor module (not shown) is embedded therein. The case 521 may be formed of an insulating material. Preferably, the case 521 may be formed of a plastic material.

The capacitor module (not shown) may be a multilayer ceramic capacitor or film capacitor.

The power transmission busbar 522C is electrically connected to the busbar assembly 600. In this case, the power transmission busbar 522C may be integrally formed with the case 521. In this case, the power transmission busbar 522C and the case 521 may be integrally formed in an insert injection molding method but are not limited thereto.

The plurality of connection terminals 522 may include input terminals 522P1 and 522N1 connected to a connector unit 800, which will be described below, output terminals 522P2 and 522N2 connected to the transistor 510, and a ground terminal 522G ground connected to the housing 100. In this case, the plurality of connection terminals 522 may be integrally formed with the case 521.

According to the embodiment, in the capacitor assembly 520, the power transmission busbar 522C may be integrally formed with the case 521 to secure insulation of the power transmission busbar 522C, reduce the number of components, and improve assemblability.

Figure 8:
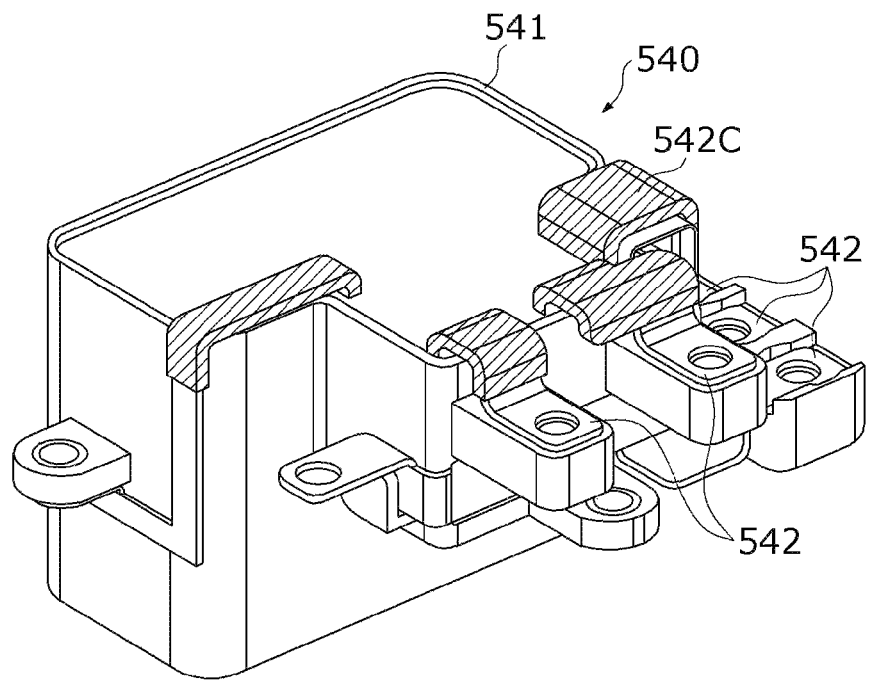
FIG. 8 is a perspective view illustrating a second example of a capacitor assembly included in the air compressor according to one embodiment of the present invention.

FIG. 8 is a perspective view illustrating a second example of a capacitor assembly included in the air compressor according to one embodiment of the present invention.

Referring to FIG. 8, a capacitor assembly 540 may include a case 541, a capacitor module (not shown), a power transmission busbar 542C, and a plurality of connection terminals 542.

The case 541 supports the capacitor module (not shown), the power transmission busbar 542C, and the plurality of connection terminals 542. In this case, the power transmission busbar 542C may be assembled with the case 541. The power transmission busbar 542C and the case 541 may be separately provided and detachably coupled to each other.

Figure 9:
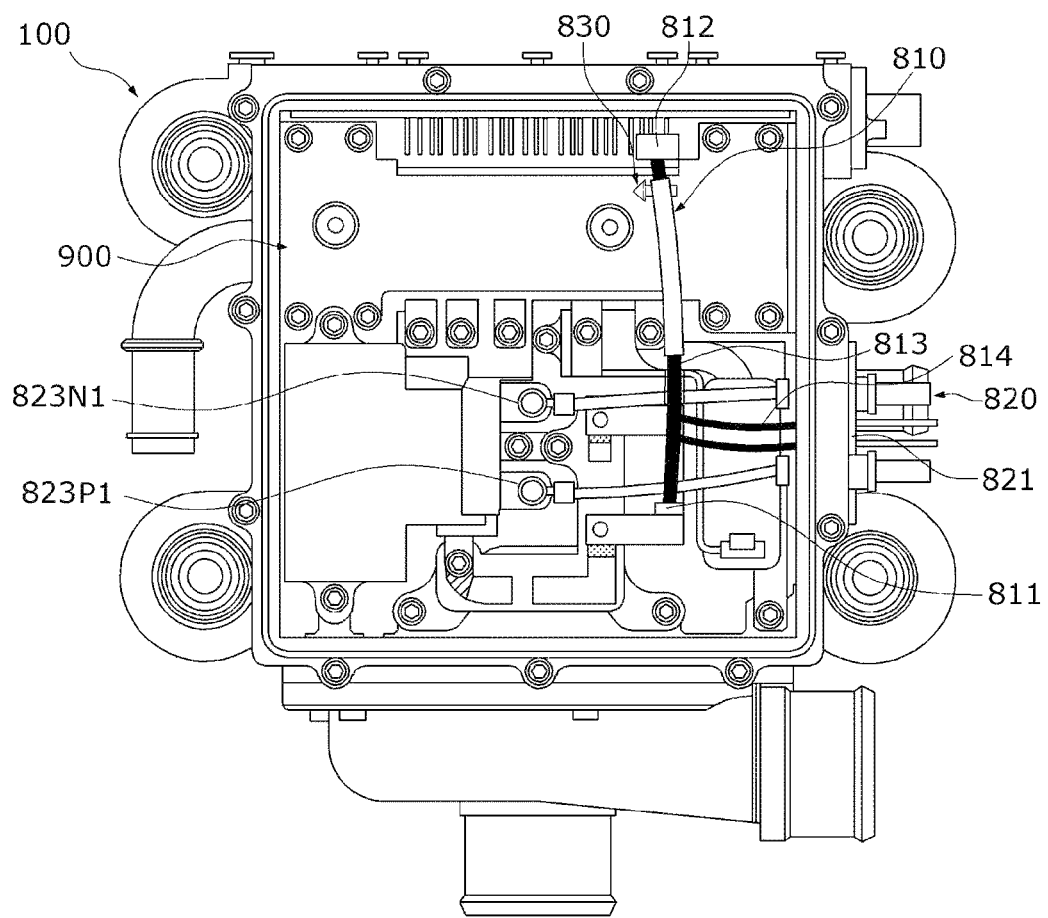
FIG. 9 is a plan view illustrating a connector unit and a cooling cover installed on the air compressor according to one embodiment of the present invention.
Figure 10:
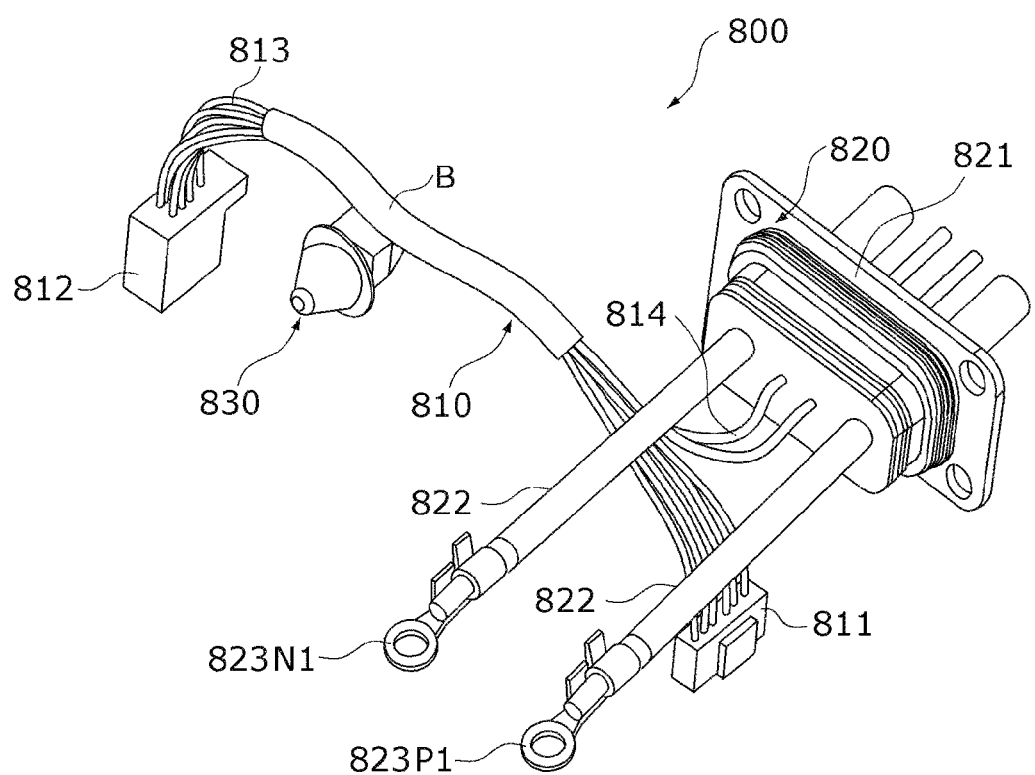
FIG. 10 is a perspective view illustrating the connector unit illustrated in FIG. 9.
Figure 11:
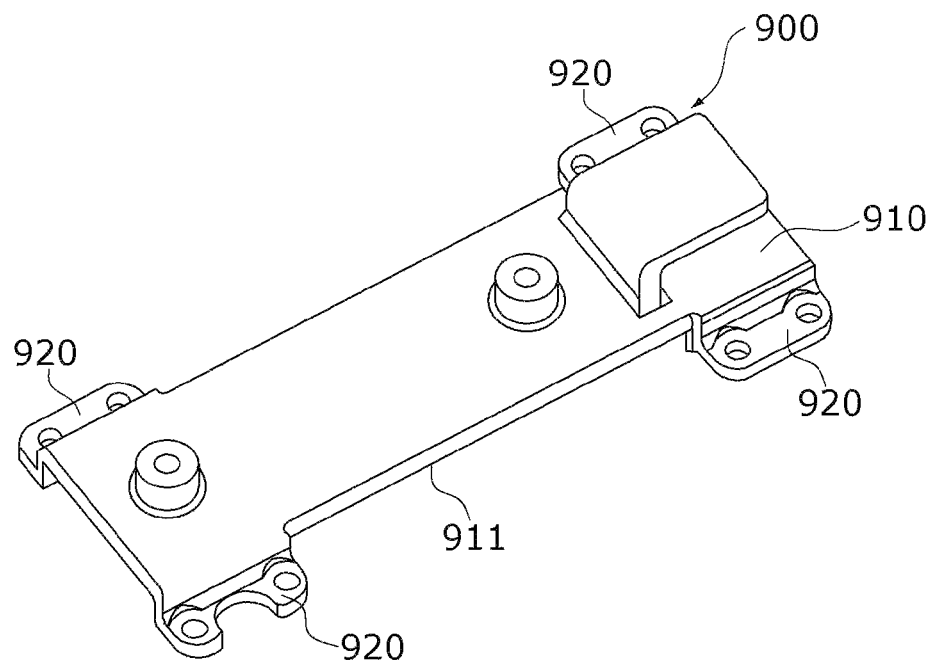
FIG. 11 is a perspective view illustrating the cooling cover illustrated in FIG. 9.

FIG. 9 is a plan view illustrating the connector unit and a cooling cover installed on the air compressor according to one embodiment of the present invention, FIG. 10 is a perspective view illustrating the connector unit illustrated in FIG. 9, and FIG. 11 is a perspective view illustrating the cooling cover illustrated in FIG. 9.

Referring to FIGS. 9 and 10, according to one embodiment of the present invention, the air compressor may further include the connector unit 800 through which external power is applied to the filter unit 500 and a signal detected by the filter unit 500 is transmitted to the control board 400.

The connector unit 800 includes a first connector 810, a second connector 820, and a fixing clip 830.

The first connector 810 electrically connects the control board 400 and the current sensor assembly 530. In addition, a part of the first connector 810 is connected to the second connector 820 to check whether the second connector 820 and the capacitor assembly 520 are connected. To this end, the first connector 810 may include a first terminal 811, a second terminal 812, a first wire 813, and an interlock wire 814.

The first terminal 811 is connected to the current sensor assembly 530, and the second terminal 812 is separated from the first terminal 811 and connected to the control board 400. In this case, the first wire 813 is provided as six first wires 813 and may be electrically connected to the first terminal 811 and the second terminal 812.

In this case, the plurality of first wires 813 may be tied using a band B. In addition, the plurality of first wires 813 may be disposed to pass above the transistor 510. In this case, the fixing clip 830 is installed on the transistor 510 to fix movement of the plurality of first wires 813.

The interlock wire 814 may be electrically connected to the second terminal 812 and the second connector 820. In this case, the interlock wire 814 may be connected to an interlock pin (not shown) which will be described below.

The second connector 820 electrically connects the external power source and the capacitor assembly 520 to apply a high-voltage DC current to the capacitor assembly 520. To this end, the second connector 820 may include a shield member 821, a second cable 822, high-voltage electrodes 823N and 823P1, and the interlock pin (not shown).

The shield member 821 may be mounted on one side of the housing 100. In this case, the shield member 821 may be formed of an insulating material. The shield member 821 may be coupled to the second cable 822 to fix the second cable 822 to the housing 100.

The second cable 822 may extend from the shield member 821 toward the capacitor assembly 520. In this case, the second cable 822 may be provided as two second cables 822.

The high-voltage electrodes 823N1 and 823P1 may be provided on end portions of the two second cables 822. In this case, the high-voltage electrodes 823N1 and 823P1 may be connected to the input terminals 522P1 and 522N1 of the capacitor assembly 520.

The interlock pin (not shown) may be embedded in the shield member 821. In this case, the interlock pin (not shown) may be connected to the interlock cable.

Referring to FIG. 11, according to one embodiment of the present invention, the air compressor may further include a cooling cover 900 for cooling the transistor 510.

The cooling cover 900 is fixedly installed on the mounting surface 121 in a state in which the cooling cover 900 covers at least one surface of the transistor 510. To this end, the cooling cover 900 may include a body 910 and a plurality of fixing parts 920.

The body 910 may be disposed on the transistor 510 and may cover an upper surface and at least a part of a side surface of the transistor 510. In this case, the body 910 may absorb heat generated by the transistor 510 and prevent overheating of the transistor 510. The body 910 may include at least one among aluminum, a synthetic resin material, and steel.

The plurality of fixing parts 920 may extend from an edge of the body 910. The plurality of fixing parts 920 may be integrally formed with the body 910 and formed of the same material as the body 910. In this case, the plurality of fixing parts 920 may be coupled to the mounting surface 121 by coupling bolts but are not limited thereto.

Figure 12:
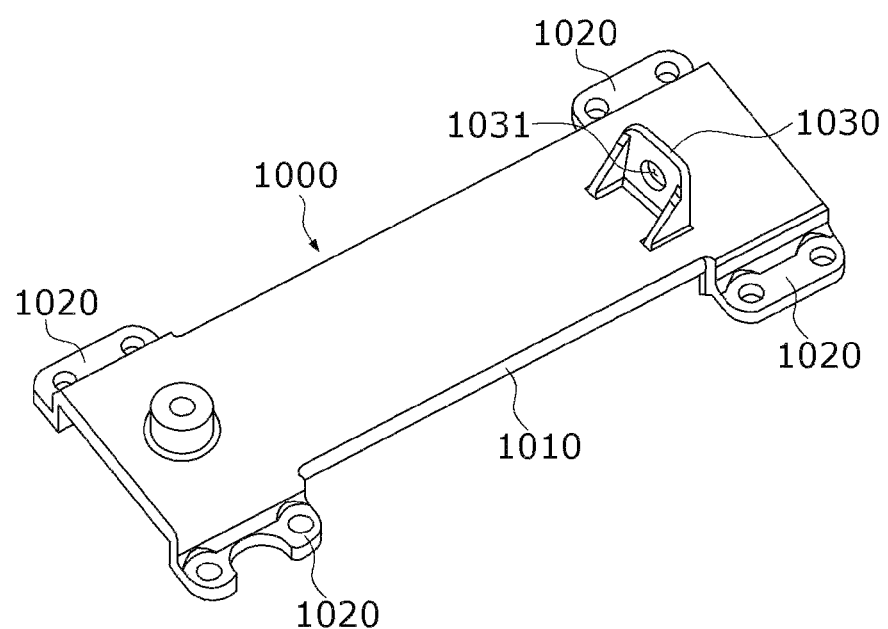
FIG. 12 is a view illustrating a second example of a cooling cover.

FIG. 12 is a view illustrating a second example of a cooling cover 1000.

Referring to FIG. 12, the cooling cover 1000 may include a body 1010, a plurality of fixing parts 1020, and a connector fixing part 1030. In this case, the body 1010 may be disposed on the transistor 510 and may cover an upper surface and at least of a part of a side surface of the transistor 510. In this case, the body 1010 may absorb heat generated by the transistor 510 and prevent overheating of the transistor 510. The body 1010 may include at least one among aluminum, a synthetic resin material, and steel.

The plurality of fixing parts 1020 may extend from an edge of the body 1010. The plurality of fixing parts 1020 may be integrally formed with the body 1010 and formed of the same material as the body 1010. In this case, the plurality of fixing parts 1020 may be coupled to the mounting surface 121 by coupling bolts but are not limited thereto.

The connector fixing part 1030 may be disposed on an upper surface of the body 1010. The connector fixing part 1030 may fix the connector unit 800 passing above the cooling cover 100. The connector fixing part 1030 may protrude upward from an upper surface of the body 1010, and a fixing hole 1031 into which the fixing clip 830 is inserted may be formed in the connector fixing part 1030. In this case, an end portion of the fixing clip 830 may be inserted into the fixing hole 1031, and thus movement of the fixing clip 830 can be prevented.

In the air compressor according to the embodiment of the present invention, assemblability can be improved, costs can be reduced, and the size can be minimized by improving the space utilization of the filter unit and reducing the number of components constituting the filter unit.

As described above, the embodiments of the present invention have been specifically described with reference to the accompanying drawings.

The above description is only an example describing a technological scope of the present invention. Various changes, modifications, and replacements may be formed by those skilled in the art without departing from the spirit and scope of the present invention. Therefore, the embodiments disclosed above and the accompanying drawings should be considered in a descriptive sense only and not to limit the technological scope. The technological scope of the present invention is not limited by the embodiments and the accompanying drawings. The scope of the present invention should be interpreted by the appended claims and encompass all equivalents falling within the scope of the appended claims.

REFERENCE NUMERALS

100: HOUSING
110: ROTATING SHAFT
120: FIRST ACCOMMODATION UNIT
200: COMPRESSION UNIT
300: MOTOR UNIT
400: CONTROL BOARD
420: SECOND ACCOMMODATION UNIT
500: FILTER UNIT
600: BUSBAR ASSEMBLY,
610: BUSBAR
620: FIXING MEMBER
700: COOLING PATH
800: CONNECTOR UNIT
900, 1000: COOLING COVER

The invention claimed is:

1. An air compressor comprising:
a housing;
a rotating shaft extending in a longitudinal direction in the housing;
a compression unit which is disposed at a front side of the rotating shaft and rotated by the rotating shaft to compress and discharge introduced air;
a motor unit which rotates the rotating shaft;
a control board which controls the motor unit;
a filter unit which supplies external power to the control board and filters noise of the power; and
a busbar assembly which transmits power of the control board to the motor unit,
wherein the filter unit includes:
a transistor connected to the control board;
a capacitor assembly connected to one side of the transistor; and
a current sensor assembly connected to the other side of the transistor,
wherein the capacitor assembly and the current sensor assembly are disposed at opposite sides with respect to the busbar assembly;
wherein the busbar assembly includes:
a plurality of busbars electrically connected to the motor unit; and
a busbar fixing member which fixes the plurality of busbars to the housing in a state in which the plurality of busbars are insulated,
wherein the plurality of busbars extend outward from the motor unit in the radial direction,
wherein each of the plurality of busbars has an end, and each respective end of the plurality of busbars is bent in different directions,
wherein each respective end of the plurality of busbars are is exposed from the busbar fixing member in a state in which the end respective ends of the plurality of busbars are spaced apart from each other.

2. The air compressor of claim 1, wherein the filter unit is disposed outside the motor unit in a radial direction.

3. The air compressor of claim 1, further comprising a plurality of cooling paths disposed between the motor unit and the filter unit,
wherein the cooling paths are disposed to be spaced apart from each other in a circumferential direction of the motor unit to surround at least one side of the motor unit.

4. The air compressor of claim 3, wherein the busbar assembly is disposed to pass between the plurality of cooling paths spaced apart from each other.

5. An air compressor comprising:
a housing;
a rotating shaft extending in a longitudinal direction in the housing;
a compression unit which is disposed at a front side of the rotating shaft and rotated by the rotating shaft to compress and discharge introduced air;
a motor unit which rotates the rotating shaft;
a control board which controls the motor unit;
a filter unit which supplies external power to the control board and filters noise of the power; and
a busbar assembly which transmits power of the control board to the motor unit,
wherein the filter unit includes:
a transistor connected to the control board;
a capacitor assembly connected to one side of the transistor; and
a current sensor assembly connected to the other side of the transistor,
wherein the capacitor assembly and the current sensor assembly are disposed at opposite sides with respect to the busbar assembly,
wherein the plurality of busbars include:
a U-phase busbar extending toward the capacitor assembly; and
a V-phase busbar and a W-phase busbar which extend toward the current sensor assembly,
wherein the U-phase busbar is electrically connected to the capacitor assembly, and
the V-phase busbar and the W-phase busbar are electrically connected to the current sensor assembly,
wherein the capacitor assembly includes:
a case;
a capacitor module embedded in the case; and
a power transmission busbar connected to the U-phase busbar.

6. The air compressor of claim 5, wherein the power transmission busbar is integrally formed with the case in an injection molding method.

7. The air compressor of claim 5, wherein the power transmission busbar is assembled with the case.

8. An air compressor comprising:
a housing;
a rotating shaft extending in a longitudinal direction in the housing;
a compression unit which is disposed at a front side of the rotating shaft and rotated by the rotating shaft to compress and discharge introduced air;
a motor unit which rotates the rotating shaft;
a control board which controls the motor unit;
a filter unit which supplies external power to the control board and filters noise of the power; and
a busbar assembly which transmits power of the control board to the motor unit,
wherein the filter unit includes:
a transistor connected to the control board;
a capacitor assembly connected to one side of the transistor; and
a current sensor assembly connected to the other side of the transistor,
wherein the capacitor assembly and the current sensor assembly are disposed at opposite sides with respect to the busbar assembly,
wherein the housing includes a first accommodation unit in which the filter unit is accommodated,
wherein the first accommodation unit includes at least one mounting surface on which the filter unit is mounted,
at least one weight lightening groove portion, in which a part of the filter unit is disposed, is formed in the mounting surface,
a plurality of coupling regions, in which the capacitor assembly, the current sensor assembly, and the busbar assembly are coupled, are disposed on the mounting surface, and
all of the plurality of coupling regions are positioned coplanar with each other.

9. The air compressor of claim 8, wherein:
the housing includes a second accommodation unit in which the control board is disposed; and
the first accommodation unit and the second accommodation unit are disposed orthogonal to each other.

10. An air compressor comprising:
a housing;
a rotating shaft extending in a longitudinal direction in the housing;
a compression unit which is disposed at a front side of the rotating shaft and rotated by the rotating shaft to compress and discharge introduced air;
a motor unit which rotates the rotating shaft;
a control board which controls the motor unit;
a filter unit which supplies external power to the control board and filters noise of the power; and
a busbar assembly which transmits power of the control board to the motor unit,
wherein the filter unit includes:
   a transistor connected to the control board;
   a capacitor assembly connected to one side of the transistor; and
   a current sensor assembly connected to the other side of the transistor,
wherein the capacitor assembly and the current sensor assembly are disposed at opposite sides with respect to the busbar assembly,
further comprising a connector unit through which a high-voltage current is applied to the filter unit and a signal detected by the filter unit is transmitted to the control board,
wherein the connector unit includes:
   a first connector which electrically connects the control board and the current sensor assembly; and
   a second connector which electrically connects an external power source and the capacitor assembly and through which a high-voltage direct current (DC) current is applied to the capacitor assembly, and
wherein the first connector includes an interlock wire which is electrically connected to the second connector and checks whether the capacitor assembly and the second connector are connected.

11. The air compressor of claim 10, further comprising a cooling cover which is disposed to cover at least one surface of the transistor and absorbs heat of the transistor.

12. The air compressor of claim 11, wherein the cooling cover includes a connector fixing part to fix one side of the connector unit.

\* \* \* \* \*